United States Patent [19]
Weiss

[11] 4,322,151
[45] Mar. 30, 1982

[54] BACKLASH-FREE CAM CONTROL

[75] Inventor: Otto Weiss, Bopfingen-Aufhausen, Fed. Rep. of Germany

[73] Assignee: Carl Zeiss-Stiftung, Oberkochen, Fed. Rep. of Germany

[21] Appl. No.: 215,043

[22] Filed: Dec. 10, 1980

[30] Foreign Application Priority Data

Dec. 22, 1979 [DE] Fed. Rep. of Germany ....... 2952078

[51] Int. Cl.³ .......................... G03B 13/02; G02B 7/10
[52] U.S. Cl. ...................................... 354/196; 350/429
[58] Field of Search .............. 350/423, 427, 429, 252, 350/255, 257; 354/195, 196

[56] References Cited

U.S. PATENT DOCUMENTS

| | | | |
|---|---|---|---|
| 2,549,230 | 4/1951 | Parody | 354/196 |
| 3,437,404 | 4/1969 | Seedhouse | 350/255 |
| 3,663,093 | 5/1972 | Iida | 350/429 |
| 4,012,124 | 3/1977 | Toda et al. | 350/429 |

FOREIGN PATENT DOCUMENTS

| | | | |
|---|---|---|---|
| 1457122 | 9/1966 | France | 350/255 |
| 557345 | 5/1977 | U.S.S.R. | 350/429 |

*Primary Examiner*—Donald A. Griffin
*Attorney, Agent, or Firm*—Hopgood, Calimafde, Kalil, Blaustein & Judlowe

[57] ABSTRACT

The invention contemplates a backlash-free cam and follower mechanism characterized by application of constant backlash-relieving resilient loading regardless of change in cam slope and regardless of displaced position of cam-driven structure with respect to the total span of possible cam-driven displacement. This result is achieved by use of two cam followers, one of which is the control follower (tracking a control cam) and the other of which is an auxiliary follower (tracking an auxiliary cam), there being resilient preloading to urge both cam followers for constant tracking of their respective cams, and the two cams being so devised with respect to each other that the orientation and spacing of the cam followers with respect to each other will remain constant throughout the full range of possible cam-driven displacement.

7 Claims, 2 Drawing Figures

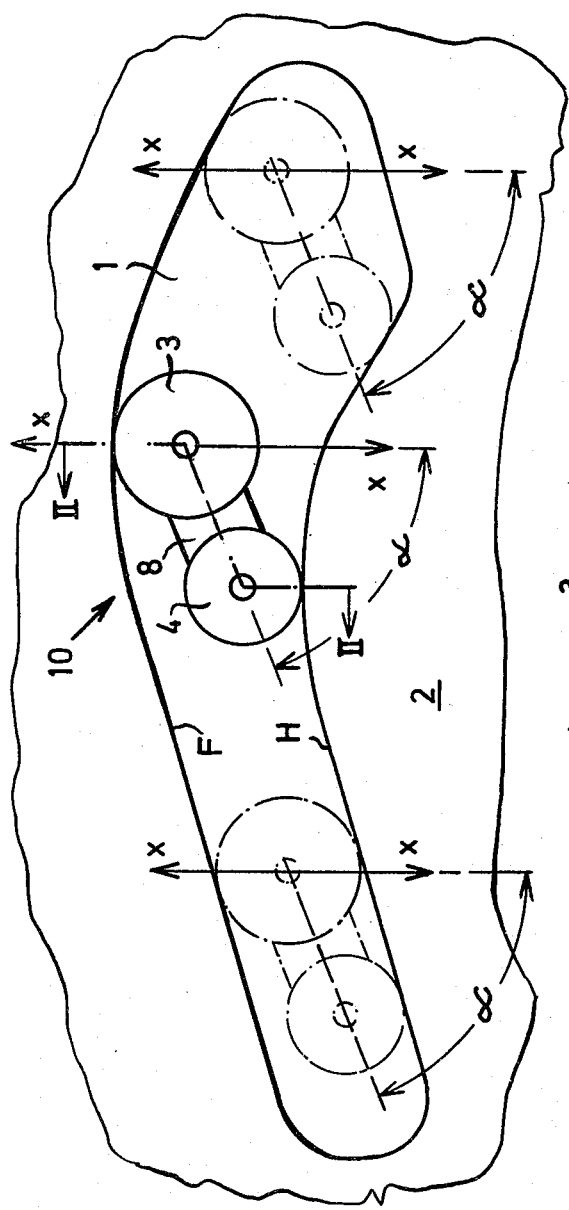
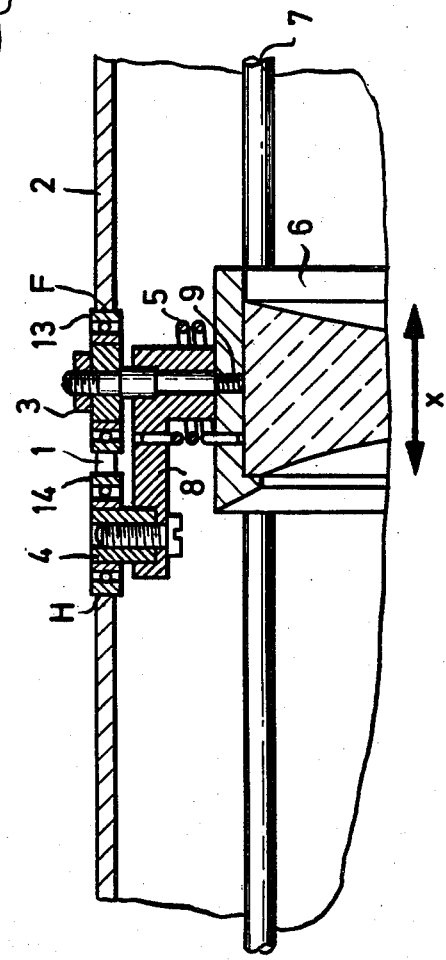

BACKLASH-FREE CAM CONTROL

BACKGROUND OF THE INVENTION

The present invention relates to a device for backlash-free cam control. Such devices are required, for instance, in the construction of photographic lenses in order to displace one or more lens members with respect to the objective tube, upon zooming or for making a distance setting. It is customary to provide one of the relatively displaceable parts with a cam guide curve and the other with a follower which slides along the guide curve. In order to obtain freedom from backlash between the parts the following possibilities are present in accordance with the prior art:

The control curve is developed as a groove having parallel surfaces and the follower which is forced into the groove bears an elastic sleeve. This has the disadvantage, however, that the follower moves in the groove with friction, which results in undesirably stiff movement of the device. The sleeves, which are generally made of plastic, are subject to considerable wear when placed under strong stress, which wear has a negative effect on the high accuracy of adjustment required for optical instruments.

It is possible to develop the follower as a roller and to apply it, free of backlash, against the guide curve by means of a spring which acts between the parts which are movable with respect to each other. Displacement devices which are made free of backlash in this manner can be moved very easily. In the case of steep curves, however, there is the undesired effect that upon termination of the adjustment force, and as a result of the greatly reduced friction, the follower may be moved by itself by the tensioned spring. In order to prevent this, the friction of the parts to be displaced must always be greater than the spring force which acts in the direction of the guide curve.

From West German Pat. No. 2,346,398 it is known, for the displacement of two lens systems in opposite directions, to apply each of the corresponding followers against its guide groove via a spring in such manner that upon the movement of the followers one spring is tensioned and the other spring is relaxed by the same amount. In this way, backward-driving forces are avoided and only slight frictional forces need be overcome upon the displacement. The device described can be used, however, only if two parts are to be displaced with respect to each other, in which connection the two courses of movement must be in a fixed proportional relationship to each other. Since two grooves and two springs which are adapted to each other are required, it is furthermore also expensive to manufacture.

BRIEF STATEMENT OF THE INVENTION

The object of the present invention is to create an inexpensive device for backlash-free cam control which can be universally used and with which the part to be controlled can be easily displaced without development of a rearward driving force in the presence of a steep cam slope.

In its presently disclosed form, the invention achieves this object in application to rectilinearly guided cam-driven structure, wherein:

(a) the control part (10) consists of two followers (3–4) which are applied by a spring force (5) acting between the two followers against in each case one of two different guide curves (F–H), respectively;

(b) the shape of one of the two guide curves (F) is so selected that, in cooperation with the first follower (3) resting thereon (this first follower being the actual control follower) the desired course of movement is obtained;

(c) the shape of the second guide curve (H) is so selected that the spring (5) which applies the second auxiliary follower (4) against it is under constant stress over the entire range of the guide curve (8).

A device of this construction therefore has merely one spring which applies both followers against the corresponding guide curves. Since the spring is under constant stress throughout the entire control range, it does not contribute to the displacement force, which occurs merely in the form of friction. The displacement force is therefore always the same regardless of the shape of the guide curve. The cam-driven part therefore cannot move back by itself.

Preferably, the two guide curves are formed by the opposite surfaces of a groove into which the control part (comprising the actual control follower and the auxiliary follower) engages. The surfaces of the groove are not at a fixed constant distance from each other; rather the surface of the groove which forms the second guide curve is developed in such manner that, depending on the shape of the first guide curve (which is the control curve proper for the guided cam-driven part) the condition is always satisfied that there shall be constant preload stress in the spring which spreads apart the respective follower projections of the control part. It is advantageous to arrange the two follower projections for rotation about the axis of the control follower proper, and such that their cam-following contacts are at a fixed distance apart. Such a control part is inserted under torsional preload into a groove which is narrower than the distance between the cam-following contacts, and the second cam guide surface is so shaped that the angle of attack of the control part (i.e., the projection which carries the auxiliary cam follower) and thus the tension of the torsion spring remains the same in every cam-engaged position of the control part.

The followers can be provided with ball bearings in order to obtain the easiest possible movement of the control part due to the transition from sliding friction to rolling friction.

DETAILED DESCRIPTION

The inventive concept will be explained in further detail with reference to the accompanying drawings, in which:

FIG. 1 is a basic sketch to illustrate one cam-control embodiment of the invention;

FIG. 2 is a fragmentary longitudinal sectional view along the line II—II of FIG. 1, for the case of a movable lens element associated with the cam control of FIG. 1.

In the drawings, the reference 1 identifies a groove which, for example, is milled into a rotatable part 2 of an objective-lens tube. The surface F of groove 1 is developed as the guide surface for a control follower 3, and follower 3 is connected with the mount for a lens member 6 which is displaceable upon rotation of the part 2. A bar 7 serves for linear guidance of member 6, which is displaceable in the X direction.

A shaft 9 connects the control follower 3 with the lens member 6, and a radially projecting arm 8 which bears a second auxiliary follower 4 is rotatably supported by shaft 9. The auxiliary follower 4 engages and tracks the auxiliary curve H of groove 1. Both followers 3 and 4 are mounted in ball bearings in order to keep the friction between the followers and the groove as low as possible.

One end of a preload spring 5 is fastened to the displaceable member 6 while its other end acts on the rotatable arm 8, in the direction to maintain follower 4 in tracking contact with the auxiliary curve H. It is thus assured that the rollers 13 and 14 of the control part 10 (which is formed of the followers 3 and 4 and inserted under tension into the groove 1) continuously ride the respective curves F and H.

The guide curve F proper is adapted in its shape to the desired functional relationship between the rotary movement of tube 2 and the longitudinal movement of lens member 6. Starting from this curve F, the auxiliary curve H is so developed that the angle of attack α of arm 8 with respect to the direction of displacement X of the lens member 6 is the same in every position of the control part 10 within the groove 1. In this way, the preload force of spring 5 remains constant, and there is no increase or decrease of spring tension in the course of movement of control part 10 in the groove 1. And even with the greatest cam slope, no undesired movements of the control part 10 itself can occur, even though the use of ball bearings at followers 3 and 4 very substantially reduces friction between groove 1 and the followers 3 and 4.

It is clear that the invention is not limited to groove guides. The described control part 10 can, for instance, also be disposed to place the followers 3 and 4 against opposed edge surfaces of a bar, where the opposed edge surfaces have the function of the guide and auxiliary curves, respectively. Furthermore, it is not necessary for torsion to exist between the two followers 3 and 4; rather, they can be inserted displaceable along their connecting line against the force of a spring, for instance into a corresponding groove. The auxiliary curve of such a groove is then developed in such manner that the distance between the two followers and thus the tension of the spring remains constant everywhere throughout passage of the followers in the groove.

What is claimed is:

1. A device for the backlash-free control of movement by means of a preferably non-linear guide curve (F) against which a control part is applied, wherein
   (a) the control part (10) consists of two projections (3-4) which are applied by a spring force (5), acting between two followers, in each case against one of two different guide curves (F-H), respectively; and
   (b) the shape of one (F) of the two guide curves is so selected that, in combination with the first follower (3) resting thereon which is the actual control follower the desired course of movement is obtained; said device being characterized by the fact that:
   (c) the shape of the second guide curve (H) is so selected that the spring (5) which applies the second, auxiliary follower (4) against it is under constant tension over the entire range of the guide curve (H).

2. A device according to claim 1, characterized by the fact that the two guide curves (F-H) are formed by the opposite surfaces of a groove (1) into which the control part (10) engages.

3. A device according to claim 2, characterized by the fact that the guide groove (1) is milled into the tube (2) of a photographic lens and that the control part (10) is coupled with the mount (6) of a displaceable lens or lens group.

4. A device according to claim 1, characterized by the fact that the control follower (3) and the auxiliary follower (4) are arranged at a fixed distance from each other and that the control part (1) which is thereby formed, and which is rotatably supported about the control follower (3), is inserted under torsional preload in a groove (1) whose guide surfaces (F-H) are at all times a distance apart from each other which is less than the distance between the opposite sides of the followers (3-4).

5. A device according to claim 1, characterized by the fact that at least one of the two followers (3-4) is supported in ball bearings.

6. In combination, elongate guide means, and cam-drivable structure guided by said guide means and including cam-follower means adapted for cam-engaged coaction, said follower means comprising a first follower roll and a pin mounting the same for rotation in the course of tracking a first non-linear cam surface, an offset arm connected for rotation about said pin and a torsional-preload spring applying unidirectional loading to rotate said arm, an auxiliary second follower roll rotatably mounted on said arm in offset relation to said first follower roll, and a displaceable cam member having said first cam surface and an auxiliary second non-linear cam surface for tracking engagement by said auxiliary follower roll, said cam surfaces being so offset from each other and so contoured in relation to each other in terms of the path of movement of said displaceable cam member (1) that said follower rolls are at all times preloaded by said spring into engagement with their respective cams and (2) that the angle of said arm remains constant with respect to the direction of said guide means.

7. In combination, elongate guide means, and cam-drivable structure guided by said guide means and including cam-follower means adapted for cam-engaged coaction, said follower means comprising first and second follower rolls carried by said structure, said first follower roll being adapted to track a first non-linear cam surface, said second follower roll being displaceably mounted in offset relation to said first follower roll, and spring means constantly urging a single direction of such displacement, and a displaceable cam member having said first cam surface and an auxiliary second non-linear cam surface for tracking engagement by said auxiliary follower roll, said cam surfaces being so offset from each other and so contoured in relation to each other in terms of the path of movement of said displaceable cam member (1) that said follower rolls are at all times preloaded by said spring into engagement with their respective cams and (2) that the displaced condition of said second follower roll remains constant, whereby the force exerted by said spring means remains constant throughout any displacement of said cam-drivable structure.

* * * * *